(12) United States Patent
Ito et al.

(10) Patent No.: US 9,400,527 B2
(45) Date of Patent: Jul. 26, 2016

(54) MOBILE TERMINAL DEVICE AND A CHASSIS

(71) Applicant: SONY CORPORATION, Tokyo (JP)

(72) Inventors: Tetsuya Ito, Tokyo (JP); Keiichi Sasamori, Chiba (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 224 days.

(21) Appl. No.: 14/098,678

(22) Filed: Dec. 6, 2013

(65) Prior Publication Data

US 2015/0085443 A1    Mar. 26, 2015

Related U.S. Application Data

(60) Provisional application No. 61/882,366, filed on Sep. 25, 2013.

(51) Int. Cl.
| | |
|---|---|
| *G06F 3/044* | (2006.01) |
| *G06F 1/16* | (2006.01) |
| *H01H 13/86* | (2006.01) |
| *H01H 13/06* | (2006.01) |
| *H04M 1/18* | (2006.01) |
| *H04M 1/23* | (2006.01) |

(52) U.S. Cl.
CPC ............ *G06F 1/1656* (2013.01); *G06F 1/1633* (2013.01); *H01H 13/86* (2013.01); *H01H 13/06* (2013.01); *H01H 2209/02* (2013.01); *H01H 2223/002* (2013.01); *H01H 2231/022* (2013.01); *H04M 1/18* (2013.01); *H04M 1/236* (2013.01)

(58) Field of Classification Search
CPC ....... G06F 1/1656; G06F 1/1637; G06F 1/16; G06F 1/1601; G06F 1/1626; G06F 3/044; G06F 1/1633; H05K 5/0086; H05K 5/03; H05K 5/0247; H05K 5/06; H05K 5/061; H05K 5/0017; H01H 2209/002; H01H 2223/002; H01H 13/06; H01H 13/86; H01H 2231/022; H04M 1/18; H04M 1/236
USPC ............. 361/679.01, 679.02, 679.55–679.58; 455/575.1–575.4; 312/223.1–223.2; 200/302.2
See application file for complete search history.

(56) References Cited

U.S. PATENT DOCUMENTS

| | | | | |
|---|---|---|---|---|
| 7,869,839 | B2 * | 1/2011 | Jung | H04M 1/026 455/347 |
| 2013/0050919 | A1 * | 2/2013 | Matsui | H04M 1/18 361/679.01 |

FOREIGN PATENT DOCUMENTS

JP        2008-10281 A    1/2008

* cited by examiner

*Primary Examiner* — Anthony Haughton
*Assistant Examiner* — Ingrid Wright
(74) *Attorney, Agent, or Firm* — Oblon, McClelland, Maier & Neustadt, L.L.P

(57) ABSTRACT

A mobile terminal device that includes a frame that supports a structure of the mobile terminal, a button that fits with a hole in the frame, a gasket that contacts with the button, a first area of which contacting with the button being configured to move when the button is pushed, and a second area of which being fixed to the frame by an adhesive, processing circuitry, and a switch that contacts with the gasket, and moves and applies current to the processing circuitry when the gasket moves in response to the button being pushed.

19 Claims, 6 Drawing Sheets

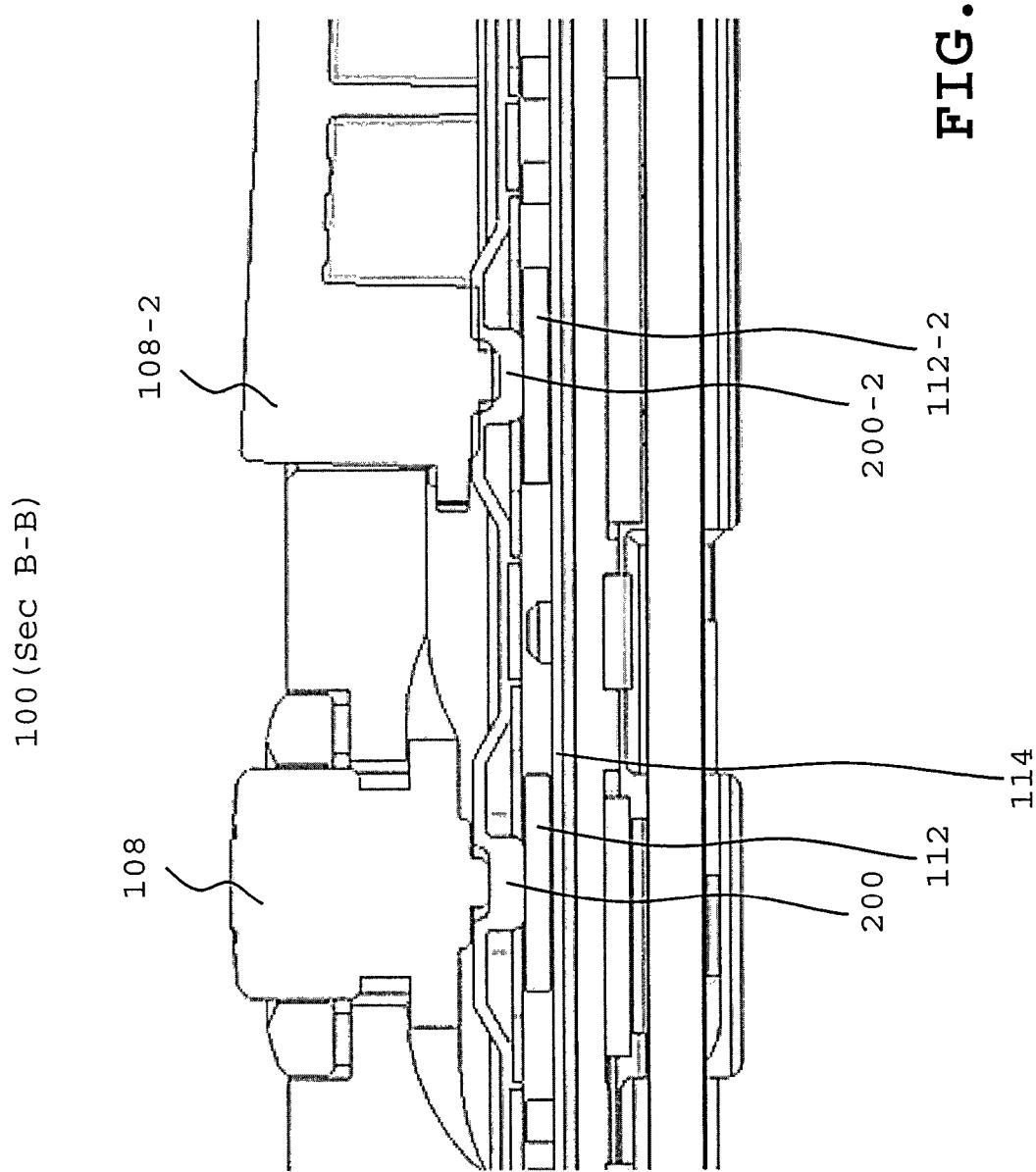

MOBILE TERMINAL DEVICE AND A CHASSIS

BACKGROUND

Field of the Disclosure

The present disclosure relates to a mobile terminal device and a chassis, and more particularly, relates to a mobile terminal device and a chassis that decreases water leaking in the chassis.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Among other things, the present disclosure provides a mobile terminal device and a chassis that decreases water leaking in the chassis. In one example embodiment, the mobile terminal device includes a frame that supports a structure of the mobile terminal, a button that fits with a hole in the frame, a gasket that contacts with the button, a first area of which contacting with the button being configured to move when the button is pushed, and a second area of which being fixed to the frame by an adhesive, processing circuitry, and a switch that contacts with the gasket, and that is configured to move and apply current to the processing circuitry when the gasket moves in response to the button being pushed, and the processing circuitry is configured to operate in response to the current being applied.

In another example embodiment, the chassis includes a frame that supports a structure of the chassis, a button that fits with a hole in the frame, a gasket that contacts with the button, a first area of which contacting with the button being configured to move when the button is pushed, and a second area of which being fixed to the frame by an adhesive, a switch that contacts with the gasket, and that is configured to move and contact with a terminal to apply current to the terminal when the gasket moves in response to the button being pushed.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1C is an exemplary cross section diagram (B-B) of a part of the mobile terminal device according to one embodiment;

DETAILED DESCRIPTION OF THE EMBODIMENTS

Figure 1A:
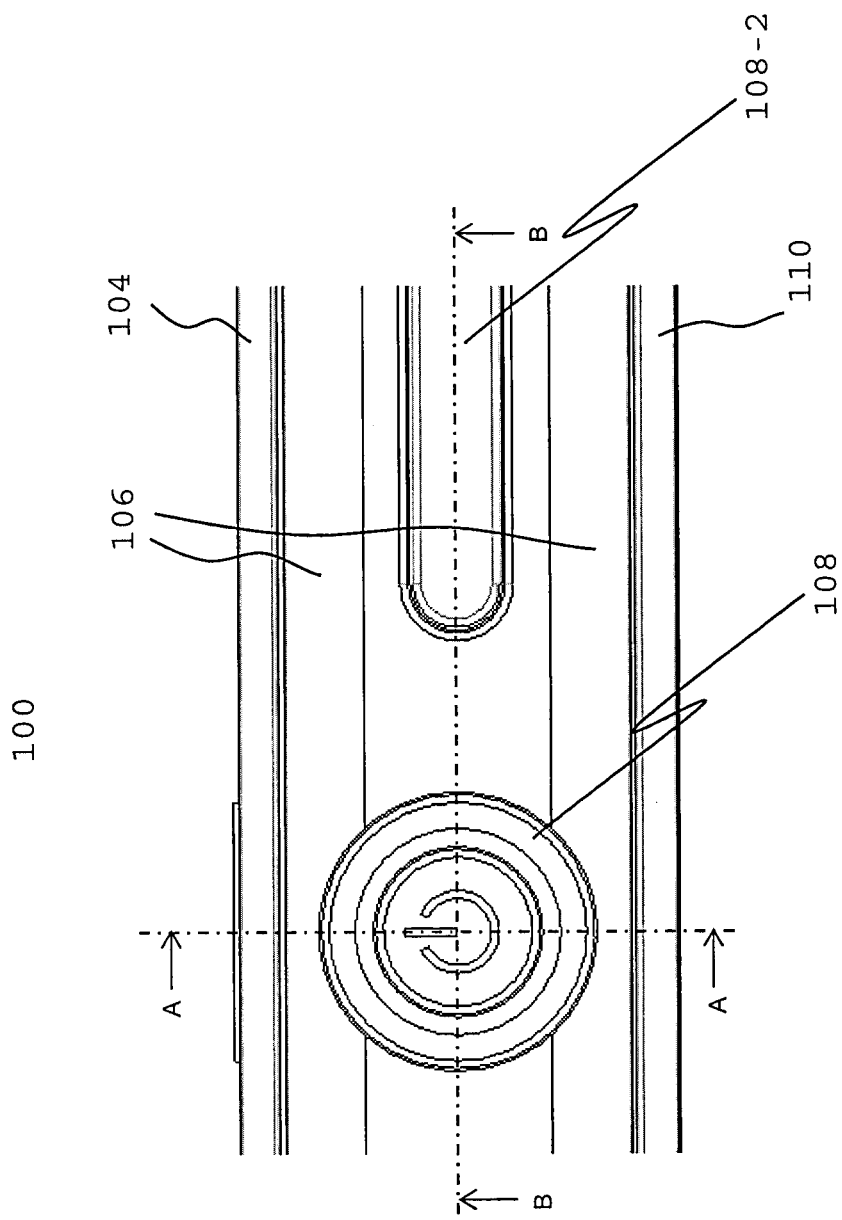
FIG. 1A is an exemplary lateral view of a part of a mobile terminal device according to one embodiment.

Referring now to the drawings, wherein like reference numerals designate identical or corresponding parts throughout the several views, FIG. 1A is an exemplary lateral view of a part of a mobile terminal device according to one embodiment. A mobile terminal device 100 is a device such as a mobile phone, tablet computer, or a notebook computer. The mobile terminal device 100 includes a rear cover 104 that supports a rear side of the mobile terminal device 100 and a front cover 100 that supports a front side of the mobile terminal device 100 together with a main frame 106 that supports a structure of the mobile terminal device 100. The mobile terminal device 100 also includes one or more button (s) 108 and 108-2 used to operates the mobile terminal device 100 (e.g., power up the device, control the volume, function as an enter key, lock the screen) in response to the button 108 being pushed and the button 108 is located on the lateral side of the mobile terminal device 100 for example.

Figure 1B:
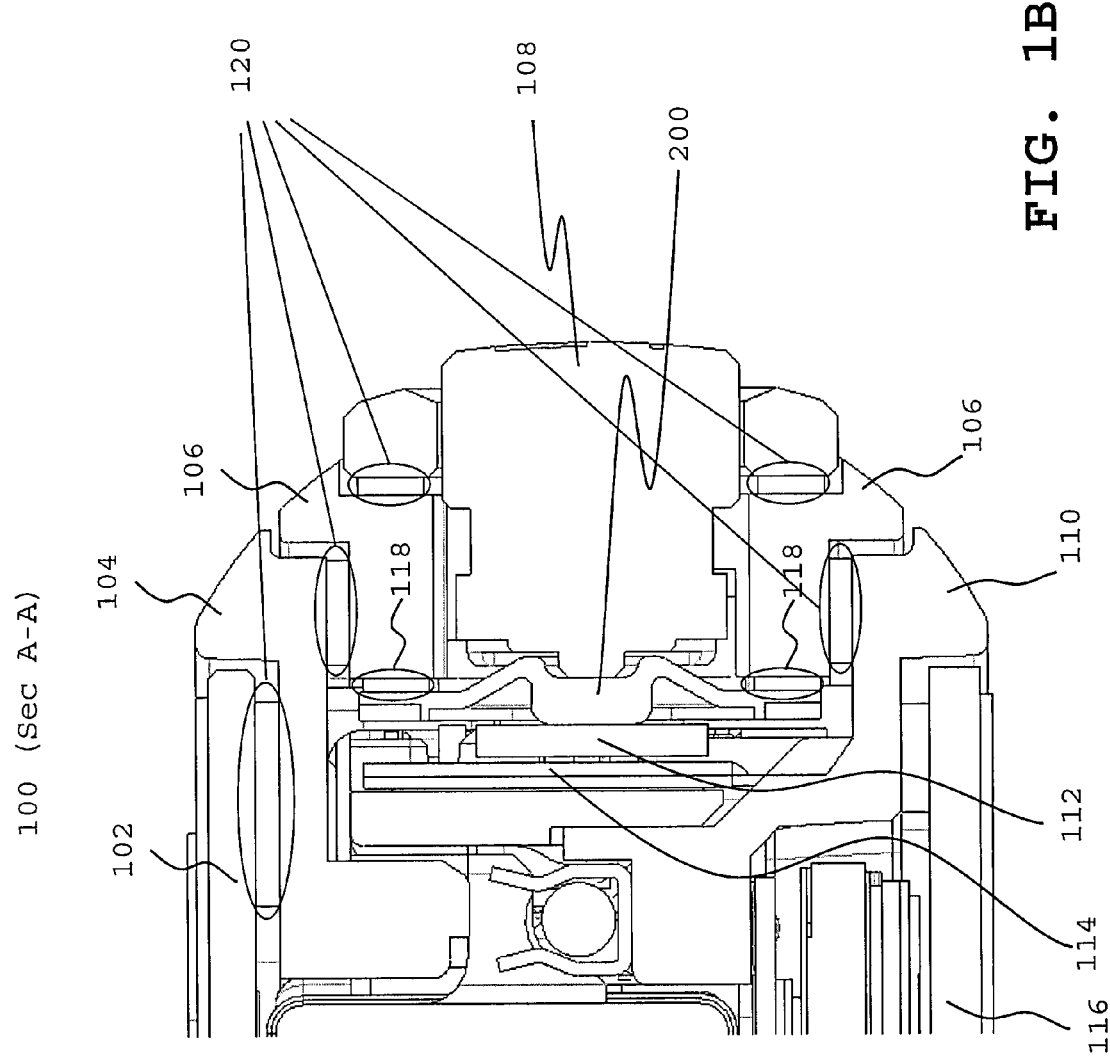
FIG. 1B is an exemplary cross section diagram (A-A) of a part of the mobile terminal device according to one embodiment.

FIG. 1B is an exemplary cross section diagram (A-A) of a part of the mobile terminal device according to one embodiment. The mobile terminal device 100 may include a back window 102 on the back side of the mobile terminal device 100. The back window 102 may be composed of glass or transparent decorative laminate and attached to rear cover 104 with adhesive 120. The rear cover 104 is a part of a frame that supports a structure of the chassis of the mobile terminal device 100 and supports especially the back side of the mobile terminal device 100. The rear cover 104 is attached to main frame 106 with adhesive 120. Front cover 110 is also a part of a frame that supports a structure of the chassis of the mobile terminal device 100 and supports especially the front side of the mobile terminal device 100. The front cover 110 is attached to the main frame 106 with the adhesive 120. The main frame 106 is part of a frame that supports the structure of the mobile terminal device 100 and located on lateral sides of the mobile terminal device 100 for example. The main frame 106 has one or more hole(s) and one or more button(s) 108 fits with the hole. The button 108 is used to operates the mobile terminal device 100 (e.g., power up the device, control the volume, function as an enter key, lock the screen) in response to the button 108 being pushed and the button 108 is located on the lateral side of the mobile terminal device 100 for example. The button 108 contacts with a gasket 200 that is configured to decrease water leaking in the mobile terminal device 100. The area of the gasket 200 contacting with the button 108 is recessed and engages with the convex area of the button 108 contacting with the gasket 200 so that the gasket 200 fixes the position of the button 108. The area of the gasket 200 contacting with the button 108 is configured to move when the button 108 is pushed, and another area of the gasket 200 is fixed to the main frame 106 located on a side of the gasket 200 the button 108 is contacting by adhesive 118. The gasket 200 contacts with a switch 112 that is configured to move and apply current to processing circuitry in the mobile terminal device 100 when the gasket 200 moves in response to the button 108 being pushed. Then the processing circuitry operates in response to the current being applied. The switch 112 may be connected with the processing circuitry via FPC (Flexible Printed Circuits) 114 and the FPC 114 apply the current to the processing circuitry, or the switch 112 may be directly connected with the processing circuitry without FPC. Display 116 (e.g., liquid crystal display) is attached to the front cover 110 on the front side of the mobile terminal device 100 and the display 116 may turn on/off or change the image to be displayed in response to the button 108 being pushed (e.g., the image on the display will change from an internet web browser screen to a main menu screen in response to the button being pushed).

FIG. 1C is an exemplary cross section diagram (B-B) of a part of the mobile terminal device according to one embodiment. The mobile terminal device 100 may include plurality of buttons 108 and 108-2, gaskets 200 and 200-2, and switches 112 and 112-2. FPC 114 may be connected with switches 112 and 112-2 in common or different FPC may be provided for each of the switch 112 and 112-2.

Figure 2:
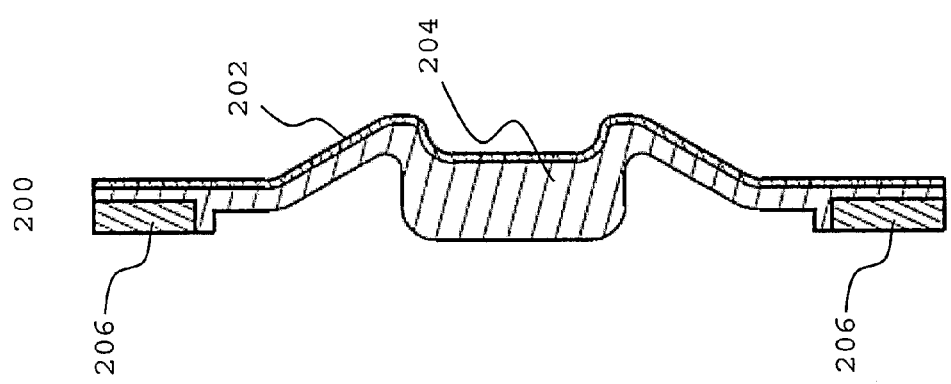
FIG. 2 is an exemplary cross section diagram of a gasket according to one embodiment.

FIG. 2 is an exemplary cross section diagram of a gasket 200 according to one embodiment. Main part 204 of the gasket 200 is preferably composed of a material, such as silicon, that enhances rebound sensed by a finger when the button 108 is pushed. It is also preferable that the gasket 200 is composed of an elastic material (e.g., silicon) so that the area contacting with the button 108 goes back to original position automatically by pushing back the button 108 to its original place after the gasket 200 is moved in response to the button 108 being pushed. The switch 112 may be composed of elastic material or have an elastic structure so that it bounces back the gasket 200 and the button 108 when it is pushed and goes back to original position after being pushed. As adhesive and silicon does not adhere with each other well in general, it is preferable that a film 202 that is configured to help the gasket 200 and the adhesive 118 adhere with each other is provided on the side of the gasket 200 contacting the button 108. For example, the film 202 is composed of urethane that enhances adhesion between the gasket 200 and the adhesive 118. As silicon and urethane is not a stiff material, the force applied to the gasket 200 and the switch 112 when the button 108 is pushed is degraded and the accuracy of dimension for manufacturing also might be decreased. Therefore it is preferable that the opposite side of the area of the gasket 200 fixed to the main frame 106 by an adhesive 118, which is on the side of the gasket 200 not contacting the button 108 is covered by a film or sheet 206 that is configured to enhance the stiffness of the gasket 200. For example, the film 206 is composed of polycarbonate. For example, the hardness of the main part 204 of the gasket 200 is about 60 Hs (Hardness spring) and the thickness is about 0.1 mm, the hardness of the film 202 is about 96 A and the thickness is about 0.05 mm, and the thickness of the film 206 is about 0.2 mm.

Figure 3:
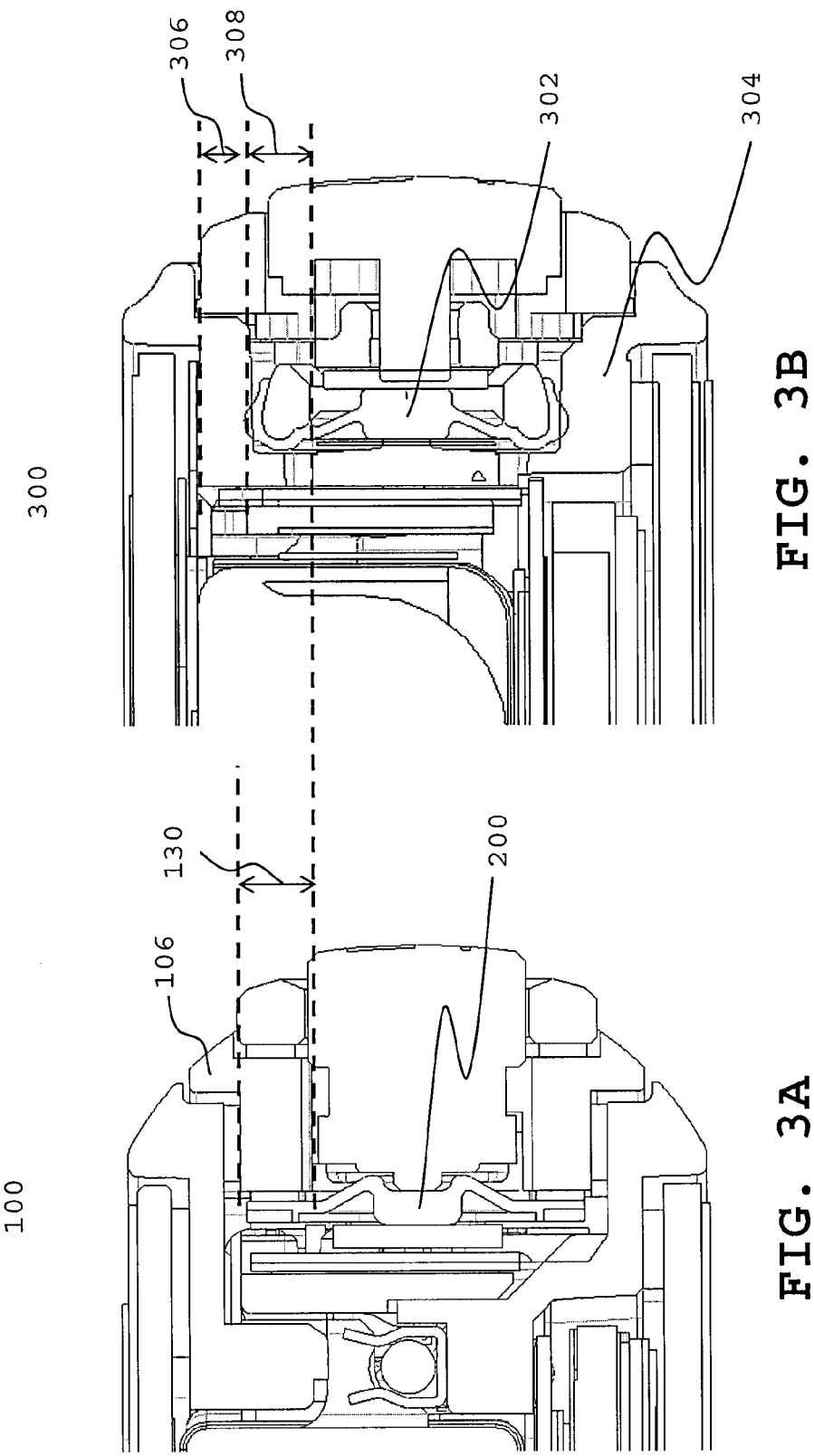
FIG. 3A is an exemplary cross section diagram of a mobile terminal device according to one embodiment.
FIG. 3B is an exemplary cross section diagram of other mobile terminal device.

FIG. 3A is an exemplary cross section diagram of a mobile terminal device 100 according to one embodiment and FIG. 3B is an exemplary cross section diagram of other mobile terminal device. According to other mobile terminal device 300, gasket 302 is crushed to a frame 304 around the gasket 302 to decrease water leaking in the mobile terminal device 300. However, in order to keep the structure of the mobile terminal device 300 stiff enough to crush the gasket 302, a certain amount of thickness 306 for the frame 304 and a certain amount of thickness 308 for the gasket 302 is needed for this implementation. On the other hand, a mobile terminal device 100 in FIG. 3A according to one embodiment requires only thickness 130 for main frame 106 contacting the gasket 200 for decreasing water leaking in the mobile terminal device 100, and thus the thickness of the mobile terminal device can be reduced according to this embodiment.

Figure 4:
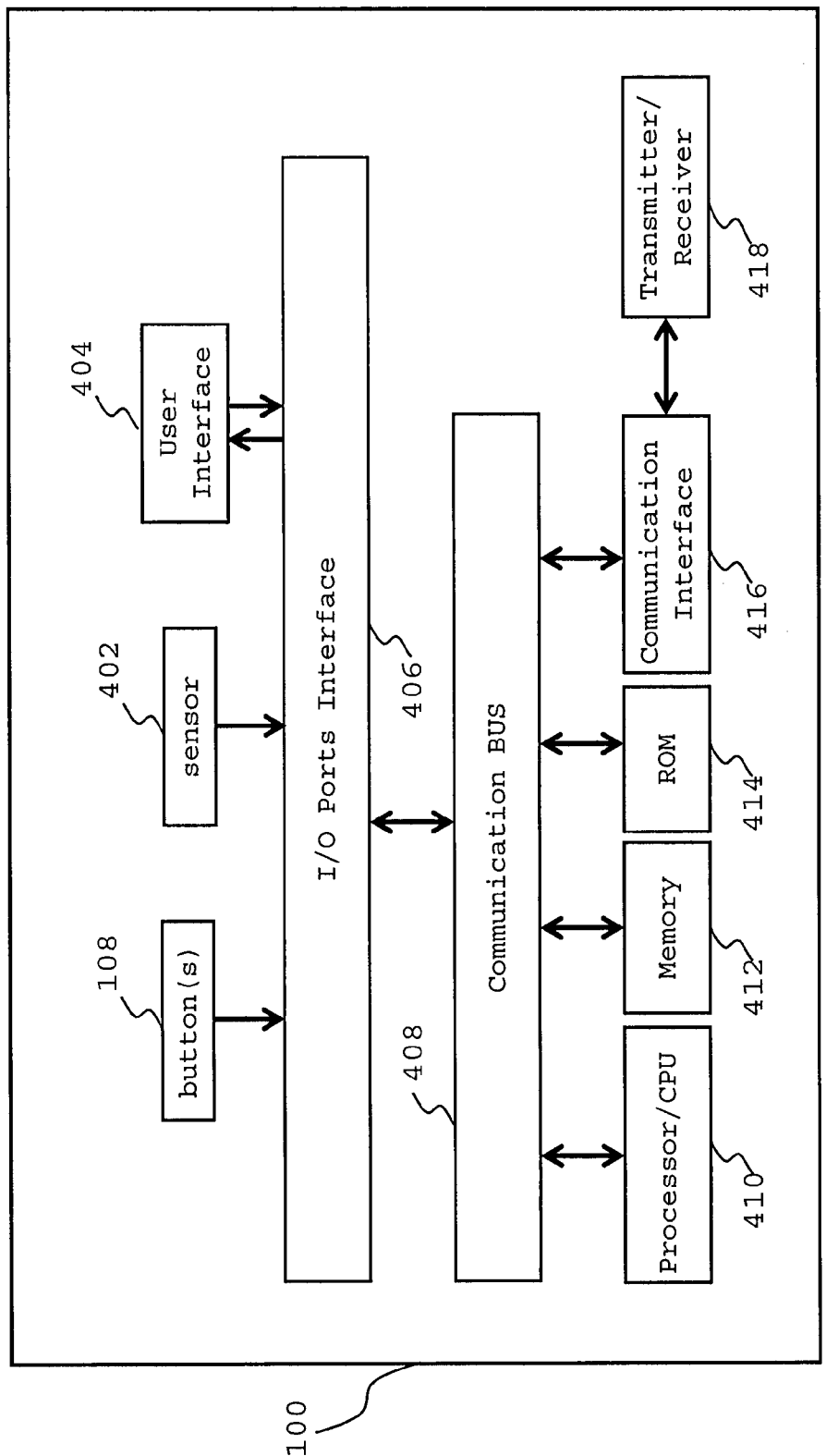
FIG. 4 is an exemplary block diagram of the mobile terminal device according to one embodiment.

FIG. 4 is an exemplary block diagram of the mobile terminal device according to one embodiment. For controlling the mobile terminal device 100, the mobile terminal device 100 includes button (s) 108 and sensor 402 (e.g., touch sensor, acceleration sensor, image sensor). The mobile terminal device 100 may also include user interface 404 (e.g., display, speaker) to output information to a user or receive input from the user. The button(s) 108, sensor 402 and user interface 404 are connected to I/O ports interface 406 and exchange data with each other. The I/O ports interface 406 may include logic to interpret the device address generated by the processor/CPU 410. The I/O ports interface 406 may also include a hand-shaking logic so that the processor/CPU 410 can communicate with the button(s) 108, sensor 402 and user interface 404 through the I/O ports interface 406. The I/O ports interface 406 is also connected to communication BUS 408. Communication BUS 408 is also connected to processor/CPU 410, memory 412, ROM 414 and communication interface 416. Communication BUS 408 stores information and instructions to be executed by the processor/CPU 410 and manages the signal transaction between each component in the mobile terminal device 100. The communication BUS 408 may include a data bus to carry information, an address bus to determine where the information should be sent and a control bus to determine its operation.

Processor/CPU 410 executes one or more sequences of one or more instructions contained in a memory, such as memory 412. Such instructions may be read into the memory 412 from another computer readable medium, such as a hard disk or removable media drive. One or more processors in a multi-processing arrangement may also be employed to execute the sequences of instructions contained in memory 412. In alternative embodiments, hard-wired circuitry may be used in place of or in combination with software instructions. Thus, embodiments are not limited to any specific combination of hardware circuitry and software. Memory 216 is any non-transitory storage device such as compact discs, hard disks, floppy disks, tape, magneto-optical disks, PROMs (EPROM, EEPROM, flash EPROM), random access memory (RAM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read and coupled to the communication bus 408 for storing information and instructions by the processor/CPU 410. In addition, the memory 412 may be used for storing temporary variables or other intermediate information during the execution of instructions by the processor/CPU 410. The mobile terminal device 100 further includes a read only memory (ROM) 414 or other static storage device (e.g., programmable ROM (PROM), erasable PROM (EPROM), and electrically erasable PRM (EEPROM)) coupled to the communication bus 408 for storing static information and instructions for the processor/CPU 410.

The mobile terminal device 100 may also include a communication interface 416 coupled to the communication BUS 408. The communication interface 416 provides a two-way data communication coupling to a network link that is connected to, for example, wired communication network (e.g., LAN) or wireless communication network (e.g., cellular networks or wireless LAN) connected to the internet. In any such implementation, the communication interface 416 sends and/or receives electrical, electromagnetic or optical signals that carry digital data streams representing various types of information. The communication interface 416 may be further connected to a transmitter/receiver 418 including a transmitter and a receiver. The network link typically provides data communication through one or more networks to other data devices. For example, the network link may provide a connection to the server, or other mobile terminal device through the internet. The mobile terminal device 100 may transmit and/or receive data, including program code, through the network(s), the network link, the transmitter/receiver 418 and the communication interface 416. The processor/CPU 410 may control the transmitter/receiver 418 to transmit information input from the button(s) 108, sensor 402 or user interface 404 to the server or other mobile terminal device through the internet or telephone. The processor/CPU 410 may control the transmitter/receiver 418 to receive information from the server or other mobile terminal device.

Obviously, numerous modifications and variations of the present system are possible in light of the above teachings. It is therefore to be understood that within the scope of the appended claims, the system may be practiced otherwise than as specifically described herein.

The invention claimed is:

1. A mobile terminal device comprising:
a frame that supports a structure of the mobile terminal device;
a button that fits within a hole in the frame;
a gasket that contacts with the button, a first area of the gasket contacting with the button being configured to move when the button is pushed, and a second area of the gasket being fixed to the frame by an adhesive, a side of the gasket contacting the button being covered with a first film of a flexible material;
processing circuitry; and
a switch that contacts with the gasket, and that is configured to move and apply current to the processing circuitry when the gasket moves in response to the button being pushed,
wherein the processing circuitry is configured to operate in response to the current being applied.

2. The mobile terminal device according to claim 1, wherein the first film is configured to help the gasket and the adhesive adhere with each other.

3. The mobile terminal device according to claim 2, wherein the second area of the gasket on a side not contacting the button is covered with a second film that is configured to enhance the stiffness of the gasket.

4. The mobile terminal device according to claim 3, wherein the gasket is composed of silicon.

5. The mobile terminal device according to claim 4, wherein the flexible material of the first film is urethane.

6. The mobile terminal device according to claim 5, wherein the second film is composed of polycarbonate.

7. The mobile terminal device according to claim 6, further comprising a flexible printed circuit that is configured to connect the switch and the processing circuitry.

8. The mobile terminal device according to claim 7, wherein the button is located on the lateral side of the mobile terminal device.

9. The mobile terminal device according to claim 8, wherein the frame is configured to function as a front cover and a rear cover of the mobile terminal device.

10. The mobile terminal device according to claim 9, wherein the gasket and the adhesive decrease water leaking in the mobile terminal device.

11. A chassis comprising:
a frame that supports a structure of the chassis;
a button that fits within a hole in the frame;
a gasket that contacts with the button, a first area of the gasket contacting with the button being configured to move when the button is pushed, and a second area of the gasket being fixed to the frame by an adhesive, a side of the gasket contacting the button being covered with a first film of a flexible material; and
a switch that contacts with the gasket, and that is configured to move and contact with a terminal to apply current to the terminal when the gasket moves in response to the button being pushed.

12. The chassis according to claim 11, wherein the first film is configured to help the gasket and the adhesive adhere with each other.

13. The chassis according to claim 12, wherein the second area of the gasket on a side not contacting the button is covered with a second film that is configured to enhance the stiffness of the gasket.

14. The chassis according to claim 13, wherein the gasket is composed of silicon.

15. The chassis according to claim 14, wherein the flexible material of the first film is urethane.

16. The chassis according to claim 15, wherein the second film is composed of polycarbonate.

17. The chassis according to claim 16, wherein the button is located on the lateral side of the chassis.

18. The chassis according to claim 17, wherein the frame is configured to function as a front cover and a rear cover of the chassis.

19. The chassis according to claim 18, wherein the gasket and the adhesive decrease water leaking in the chassis.

* * * * *